(12) United States Patent
Jones et al.

(10) Patent No.: US 7,680,139 B1
(45) Date of Patent: Mar. 16, 2010

(54) SYSTEMS AND METHODS FOR QUEUE MANAGEMENT IN PACKET-SWITCHED NETWORKS

(75) Inventors: Christine Elaine Jones, Waltham, MA (US); Gregory Donald Troxel, Stow, MA (US)

(73) Assignees: Verizon Patent and Licensing Inc., Basking Ridge, NJ (US); BBN Technologies Corp., Basking Ridge, NJ (US)

( * ) Notice: Subject to any disclaimer, the term of this patent is extended or adjusted under 35 U.S.C. 154(b) by 1339 days.

(21) Appl. No.: 11/087,408

(22) Filed: Mar. 23, 2005

Related U.S. Application Data (60) Provisional application No. 60/555,972, filed on Mar. 25, 2004.

(51) Int. Cl.
*H04L 12/28* (2006.01)
*H04L 12/56* (2006.01)
*H04L 12/26* (2006.01)

(52) U.S. Cl. .................. 370/414; 370/230.1; 370/231; 370/238; 370/418

(58) Field of Classification Search ......... 370/412–418, 370/229–231, 235, 236
See application file for complete search history.

(56) References Cited

U.S. PATENT DOCUMENTS

| | | | |
|---|---|---|---|
| 6,643,293 B1 * | 11/2003 | Carr et al. | 370/399 |
| 6,680,933 B1 * | 1/2004 | Cheesman et al. | 370/352 |
| 6,912,226 B2 * | 6/2005 | De Cnodder et al. | 370/412 |
| 7,073,005 B1 * | 7/2006 | Basu et al. | 710/240 |
| 7,362,749 B2 * | 4/2008 | Bishard | 370/357 |
| 2002/0027879 A1 * | 3/2002 | Kuriki et al. | 370/229 |
| 2002/0048277 A1 * | 4/2002 | Bennett | 370/412 |
| 2003/0165148 A1 * | 9/2003 | Bishard | 370/412 |

OTHER PUBLICATIONS http://en.wikipedia.org/wiki/Priority_queue (last modified Jan. 17, 2005) (2 pages).

* cited by examiner

*Primary Examiner*—Ronald Abelson (57) ABSTRACT

This disclosure relates to methods and systems for queuing traffic in packet-switched networks. In one of many possible embodiments, a queue management system includes a plurality of queues and a priority module configured to assign incoming packets to the queues based on priorities associated with the incoming packets. The priority module is further configured to drop at least one of the packets already contained in the queues. The priority module is configured to operate across multiple queues when determining which of the packets contained in the queues to drop. Some embodiments provide for hybrid queue management that considers both classes and priorities of packets.

43 Claims, 5 Drawing Sheets

SYSTEMS AND METHODS FOR QUEUE MANAGEMENT IN PACKET-SWITCHED NETWORKS

RELATED APPLICATION

This application claims priority under 35 U.S.C. §119(e) to U.S. Provisional Patent Application Ser. No. 60/555,972, by Christine Elaine Jones et al., filed on Mar. 25, 2004, and entitled PRIORITY QUEUES WITH RED, the contents of which are hereby incorporated by reference in their entirety.

STATEMENT REGARDING FEDERALLY SPONSORED RESEARCH OR DEVELOPMENT

This invention was made with Government support and is subject to Government contract number NOOOI4-03-C-0230. The government has certain rights in the invention.

FIELD

This disclosure relates to methods and systems for queuing traffic in packet-switched networks.

BACKGROUND OF THE INVENTION

Packet-switched networks (e.g., the Internet) are useful for transmitting packetized data between different network devices. Such networks typically include nodes configured to communicate with each other by sending packets over links. Often, communications sent from one node must travel through intermediary nodes before reaching the destination node. The intermediary nodes are able to decipher routing information contained in the communication packets and forward (i.e., route) the packets in accordance with the information. The packets sent by a node may take different network paths to reach the destination node, where the packets are reassembled.

The routing of packets over packet-switched networks continues to become more complex, especially for networks that support time-sensitive applications (e.g., voice-over-IP) and/or provide quality-of-service ("QoS") guarantees to customers. Such networks are able to support different levels of service by prioritizing some communication packets over others. Prioritization of packets for transmission is typically performed in the nodes (e.g., at the routers) of networks, where packets are queued for transmission over a link.

Priority queuing refers to techniques for queuing packets for transmission based on priority. Many priority queuing techniques separate packets into distinct priority queues based on priority. Such techniques typically decipher priority levels of incoming packets, usually from information contained in the packets, and add the packets to the priority queues, with the highest priority packets being added to the highest priority queues, and so on down through the lowest priority queue. The packets in the different queues are then selected for transmission based on priority, with any queues in the highest priority queue being selected first for transmission. The practice of transmitting higher priority packets ahead of lower priority packets can be referred to as delay priority.

While conventional priority queuing techniques have enabled many packet-switched networks to support different levels of service having various QoS requirements, the queuing techniques exhibit shortcomings under certain routine network conditions. For example, delay priority often causes low priority queues to become congested when high priority traffic continues to flow into the high priority queues and dominate allocation of available bandwidth. Low priority queues are likely to continue to be filled even when all available bandwidth is being used for high priority traffic. This causes long delays for low priority traffic waiting for higher priority queues to clear.

If the higher priority queues are eventually cleared of packets, the low priority packets in the low priority queues will be suddenly transmitted using all available resources. The buildup followed by sudden transmittal of low priority packets may repeat with unpredictable inconsistency per cycle. Each cycle may vary significantly from other cycles due to the unpredictable nature of high priority traffic demands. Consequently, low priority traffic often exhibits significant discrepancies in lengths of transmission delay (i.e., latency). Unfortunately, significant variations may adversely affect congestion control mechanisms commonly used by network transmission protocols (e.g., transmission control protocol ["TCP"]). In other words, conventional priority queuing techniques suffer from the tendency to create unfair and highly variable traffic flows for low priority traffic. This problem may be referred to as a lack of flow fairness.

To help avoid congestion in priority queues, several conventional queuing techniques have been introduced for dropping packets from the priority queues. Unfortunately, these techniques are rather limited because they are applied to each priority queue on an individual basis. The dropping of packets is performed at each particular priority queue without considering packets in the other priority queues. Consequently, low priority queues may continue to be filled with packets without dropping them even when the packets will not be transmitted for a lengthy amount of time because of the presence of significant high priority traffic that will take precedence over lower priority traffic within the available bandwidth. Conventional queuing techniques fail to consider the presence of higher priority packets in the higher priority queues when determining the appropriate drop rate for lower priority queues.

Thus, although conventional queuing techniques are able to control transmission delay based on priority, current packet-dropping techniques do not adequately alleviate congestion in low priority queues because the techniques drop packets from the priority queues without considering the status of other priority queues. Moreover, conventional queuing techniques related to priority queuing do not adequately support flow fairness for low priority traffic.

SUMMARY OF THE INVENTION

This disclosure relates to methods and systems for queuing traffic in packet-switched networks. In one of many possible embodiments, a queue management system includes a plurality of queues and a priority module configured to assign incoming packets to the queues based on priorities associated with the incoming packets. The priority module is further configured to drop at least one of the packets already contained in the queues. The priority module is configured to operate across multiple queues when determining which of the packets contained in the queues to drop.

Another possible embodiment of a queue management system includes a plurality of queues and a priority module configured to assign incoming packets to the queues based on priorities associated with the incoming packets. The priority module is further configured to drop one or more of the incoming packets before the number of packets already contained in the queues has reached a maximum occupancy. The priority module is configured to operate across multiple queues when determining which of the incoming packets to drop.

In another possible embodiment, a hybrid queue management system includes classes, queues within each of the classes, and priority levels associated with the queues. A classifier is configured to selectively assign incoming packets to the classes. A priority module is provided for each of the classes and is configured to assign the incoming packets within each of the classes to the queues based on priorities associated with the incoming packets. The priority module is further configured to drop one or more of the incoming packets before the number of packets already contained in the queues has reached a maximum occupancy. The priority module is configured to operate across multiple queues when determining which of the incoming packets to drop. The system further includes a combination of one or more priority schedulers and class schedulers. The combination is configured to selectively schedule the packets contained in the queues for transmission based on the classes and the priority levels.

In yet another possible embodiment, a hybrid queue management system includes classes, queues within each of the classes, and priority levels associated with the queues. A classifier is configured to selectively assign incoming packets to the classes. A priority module is provided for each of the classes and is configured to assign the incoming packets within each of the classes to the queues based on priorities associated with the incoming packets. The priority module is further configured to drop at least one of the packets already contained in the queues. The priority module is configured to operate across multiple queues when determining which of the packets contained in the queues to drop. The system further includes a combination of one or more priority schedulers and class scheduler. The combination is configured to selectively schedule the packets contained in the queues for transmission based on the classes and the priority levels.

In some embodiments, the priority module is configured to determine a group of the queues based on priority levels associated with the queues. In some embodiments, the group includes a first queue having a first priority levels and each of the queues having higher priority levels than the first priority level. In some embodiments, the priority module is configured to operate on the group of queues to determine which packet to drop. Methods for queue management are also provided.

The present disclosure will be more fully understood upon reading the following detailed description in conjunction with the accompanying drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION

I. Overview

Systems and methods for managing queues in packet-switched networks are disclosed. More specifically, the systems and methods (collectively the "system") provide for queue management that can drop packets from priority queues based on the priority levels of the packets. The system is able to drop incoming packets and/or packets already contained in the queues. For drop operations, the system is capable of operating across a set of the queues, including a group of multiple queues. For example, priority levels may be associated with the queues, and the system may consider occupancy levels of both a particular queue and all queues having higher priority levels than the particular queue. Groups of the priority queues may be dynamically determined based on priority levels of incoming packets. The queue or queues within the groups are then considered for drop operations. For example, the occupancy levels of the queues in the group may be considered to help determine whether to drop a packet and/or which packet to drop.

Further, hybrid embodiments of the system are capable of balancing transmission delay priority with traffic flow fairness, which balance is especially helpful for stabilizing low priority traffic. Transmission delay priority refers to the prioritization of high priority packets contained in priority queues for transmission, and flow fairness refers to maintaining a fair traffic flow between different classes and/or flows of traffic. Hybrid embodiments of the system may use both class-based and priority-based queuing processes to provide an enhanced beneficial balance between transmission delay priorities and flow fairness so that higher-priority traffic is prioritized for transmission while the flow of lower priority traffic is considered. As a result, overall congestion is reduced while the available bandwidth is used more efficiently. Moreover, the flow of lower priority traffic can be guaranteed while still prioritizing higher priority traffic.

As discussed in greater detail below, incoming packets may be assigned to priority queues based on the priority levels associated with the packets. A priority module is configured to drop packets from the queues while operating across a group of multiple queues. Accordingly, packets may be dropped from lower priority queues in a manner that considers packets of higher priority queues. In this manner, embodiments of the system are able to avoid congestion by selecting packets to drop based on priority, which process may be referred to as drop priority.

Further, priority queues and drop priority may be combined with class-based partitioning to provide a balance between flow fairness and transmission delay priority. As discussed in greater detail below, incoming packets may be classified and assigned to distinct classes. Within each of the classes, packets may be assigned to priority queues based on priorities of the packets. Combinations of one or more class-based schedulers and priority schedulers may be configured to determine the order in which packets in the queues will be selected for transmission. By managing network queues in this manner, the system is capable of supporting QoS and/or CoS guarantees for various levels of service. Accordingly, the system is capable of supporting a wide range of applications, including time-sensitive applications such as voice-over-IP ("VoIP"), without unduly delaying the transmission of packets that may not be labeled as time sensitive.

II. Introduction of Elements

Figure 1:
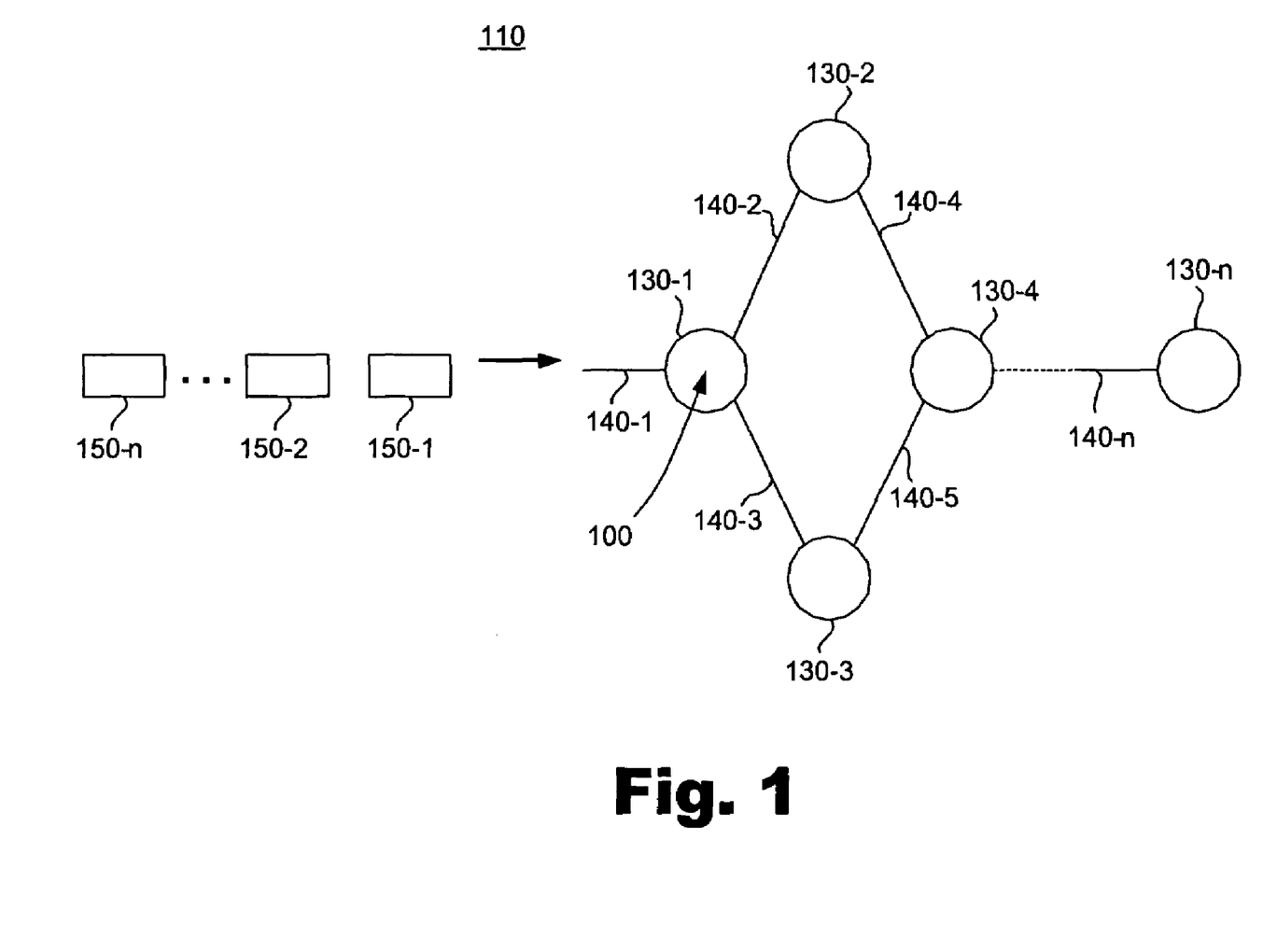
FIG. 1 is a block diagram illustrating an example of a packet-switched network having an exemplary queue management system implemented therein, according to one embodiment.

The present systems and methods may be implemented in any suitable packet-switched network that is capable of prioritizing network traffic. FIG. 1 is a block diagram illustrating an example of a packet-switched network 110 having an exemplary queue management system 100 (also referred to simply as "the system 100") implemented therein, according to one embodiment. System 100 may be implemented using a variety of hardware approaches known to those of ordinary skill in the art, and the instructions for implementation may be stored using a computer-readable medium. As shown in FIG. 1, the packet-switched network 110 (also referred to simply as "the network 110") may include nodes 130-1 through 130-$n$ (collectively "the nodes 130") connected by links 140-1 through 140-$n$ (collectively "the links 140"). The nodes 130 are configured to transmit packets 150-1 through 150-$n$ (collectively "the packets 150") over the links 140. As known to those skilled in the art, the packets 150 may take different paths over the network 110, as determined by routing disciplines implemented in the nodes 130. As discussed in detail below, the system 100 is configured to queue and manage the packets 150 in one or more of the nodes 130 for routing over the links 140.

The system 100 may be implemented as instructions stored in a computer-readable medium or media. The medium or media may be part of or otherwise accessible by one or more of the nodes 130. The instructions may be configured to cause a processor (not shown) of a node 130 to perform any of the steps described herein. The instructions may be in the form of software and/or firmware applications, or in any other suitable form. In many embodiments, the system 100 comprises computer-readable instructions configured to cause a node 130 (e.g., a router) to perform any of the predefined queue management processes described below.

While an exemplary implementation of the system 100 is shown in FIG. 1, those skilled in the art will recognize that the exemplary components illustrated in the Figure are for purposes of illustration and not intended to be limiting. Indeed, those skilled in the art will recognize that other alternative network environments may be used in other embodiments. Further, the system 100 may be implemented in one or more of the nodes 130 of the network 110. Each element of the packet-switched network 110 shown in FIG. 1 will now be discussed in greater detail.

A. Packet-Switched Network

The packet-switched network 110 may be in the form of a wide variety of different types and/or configurations of networks capable of transmitting packets 150. More specifically, the packet-switched network 110 may include any suitable technology or technologies (e.g., routing technologies) that enable transmission of packets between the nodes 130. The packet-switched network 110 may be configured to transmit packets 150 in accordance with known data structures, network layers, and network protocols, including, but not limited to, transmission control protocol ("TCP"), Internet protocol ("IP") (e.g., version four and version six), user datagram protocol ("UDP"), real-time transport protocol ("RTP"), utilizing directional antennae in ad hoc networks ("UDAAN"), X.25, asynchronous transfer mode ("ATM"), multi-protocol label switching ("MPLS"), point-to-point protocol ("PPP"), address resolution protocol ("ARP"), synchronous optical networking ("SONET"), integrated services digital network ("ISDN"), and open systems interconnection ("OSI") layers and protocols, to name a few.

The network 110 may be configured to queue and transmit packets 150 having different protocols and/or OSI layers. As discussed below, the packets 150 may be configured to allow the network 110 to determine and compare priority levels between packets 150 of different protocols and layers. For example, IP packets may be mapped to UDAAN packets in a manner that allows the system 100 to determine the priority of the packets 150 in either protocol.

The packet-switched network 110 may be configured to transmit packets 120 in accordance with a wide variety of prioritization techniques. For example, the packet-switched network 110 may be configured to identify priority labels contained in the packets 150 and prioritize the packets 150 for transmission in accordance with the identified priority levels. This allows the network 110 to support quality-of-service ("QoS") applications and services, including those that require transmission of time-sensitive data. With prioritization, the network 110 can transmit high priority network traffic with reduced latency and packet loss. Priority labels will be discussed in further detail below in relation to the packets 150.

The network 110 may be configured to transmit packets 150 based on both priority and class. For example, the system 100 may be configured to classify packets 150 into different categories (e.g., classes), based on any suitable characteristic (e.g., protocol type) of the packets 150. The classes may be predefined. The network 110 may be preconfigured to allocate overall resources (e.g., bandwidth) among the different classes to promote flow fairness, as described below.

In some embodiments, the network 110 may be configured with some form of admission controls for controlling the amount of traffic injected into the network 110. The admission controls may be configured to limit the amount of certain types of packets 150 (e.g., packets 150 having a high-priority label) injected in the network 110.

B. Links

The packet-switched network 110 may use any known or not yet developed communication medium or media for the transmission of packets 150 between the nodes 130. For example, the links 140 may comprise any known medium or media capable of carrying the packets 150 between the nodes 130 of the network 110. The links 140 may be in the form of wireless connections, including, but not limited to radio frequency connections (e.g., cellular connections), infrared connections, or any other known type of wireless connection. The links 140 may be in the form of non-wireless connections such as telephone lines, cable lines, fiber lines, etc.

C. Packets

The packets 150 may be in the form of any known or not yet developed packet structures capable of being transmitted over the network 110. For example, the packets 150 may conform to any of the network protocols mentioned above, including TCP, IP, ARP, UDP, and UDAAN.

The packets 150 may conform to any layer or protocol of the open systems interconnection ("OSI") model, which model is well known to those skilled in the art. In many embodiments, the packets 150 incoming to the nodes 130 are at the network or sub-network layer (e.g., a sub-network layer in the form of UDAAN) of the OSI model, as will be understood by those skilled in the art. In other embodiments, the packets 150 may be at other layers of the OSI model, including the data link layer and the physical layer.

Preferably, the packets 150 include priority labels indicative of different priority levels. This allows the system 100 to prioritize packets 150 for transmission based on their priority labels, as described below. The priority labels may be contained in one or more fields of the packets 150 (e.g., in header fields) and may be in any known or not yet developed form. For example, the priority labels may be contained in type-of-service ("ToS"), differentiated services ("DS"), explicit congestion notification ("ECN"), and/or per-hop forwarding ("PHB") fields, which are well-known in the field.

In many embodiments, the priority label is contained in the DS field, and packets 150 are marked with a DS Codepoint ("DSCP"), which may be used by the nodes (130) to map the packets 150 to different per-hop forwarding behaviors ("PHBs"). A PHB defines a particular service level by providing a coded description of externally observable forwarding behavior. Higher priority packets correspond to PHBs that are preferable in terms of both bandwidth and delay, while lower priority packets are relegated to slower services. The system 100 may use the PHBs to identify priority levels of packets 150 for queue management purposes. The PHBs may be of any form known in the art. Preferably, the PHBs are configured to be at least partially backwards compatible with ToS definitions by including Class Selector Codepoints, which are known to those skilled in the art and are useful for ensuring forwarding compatibility with ToS.

In many embodiments, the packets 150 are in Internet protocol ("IP") form and use the ToS or DS fields to indicate priority level. One method of flow control in optical networks, known as optical burst switching ("OBS"), may be used assign priorities to packets 150 based on the contents of the ToS field contained in the headers of the packets 150. Updated standards may also be used, including the six-bit differentiated service ("DS") and two-bit explicit congestion notification ("ECN") fields. The DS field is an unstructured six-bit field in which DSCPs are encoded, and is capable of conveying sixty-four distinct codepoints.

IP packets 150 useful for network-layer routing, such as "open shortest path first" ("OSPF") and "distance vector multicast routing protocol" ("DVMRP"), may be encoded with an "Internetwork Control" DSCP. Other IP control traffic may contain DSCPs that map to a lower priority. Internet group management protocol ("IGMP") packets may be encoded with the Class Selector Codepoint equivalent to the ToS priority precedence. IP packets 150 of type "network time protocol" ("NTP") and "Internet control message protocol" ("ICMP") may be encoded with "low delay" and "high throughput" DSCPs, respectively. Also, simple network management protocol ("SNMP") traffic should default to a "low delay" DSCP, but may be elevated to a higher priority DSCP (e.g., "Internetwork Control"). General user traffic may be encoded with any DSCP other than that indicating "Network Control" (which may be reserved for sub-network control traffic) and "Internetwork Control."

As mentioned above, the network 110 may be configured to process DS fields that may map to one or more predetermined priority levels. For example, the DS field may define a default DSCP that maps to a "best-effort" forwarding priority level (equivalent to known ToS "Routine" service). Non-IP packets may or may not have a DS field. Those with a DS field can be handled similarly to IP packets with a DS field. Those without a DS filed may be treated as if they had a default DSCP, or an implicit mapping may be predefined. For example, IP packets 150 may be mapped to UDAAN packets 150 in a manner that allows the system 100 to use the UDAAN packets 150 to identify priority levels.

UDAAN packets 150 may be marked differently based on their contents. For example, a UDAAN control packet 150 typically does not include a field in which to encode a DSCP. Therefore, UDAAN control packets 150 may be implicitly mapped to a "Network Control" DSCP. This DSCP should map to the highest priority forwarding service for ensuring maintenance of network connectivity and performance.

UDAAN data packets 150 typically include a ToS field in the header. Accordingly, the system 100 may be configured to determine queuing behaviors of UDAAN data packets 150 by interpreting the ToS field as a DS field. This includes determining a priority level of a UDAAN packet 150.

Other packet protocols that do not include a DS field may be implicitly mapped to a predetermined priority level. For example, the system 100 may be configured to map ARP packets to a priority level associated with the Class Selector Codepoint equivalent of the ToS "precedence" priority, which is known in the art.

In some embodiments, the system 100 may be configured to map certain types of packets to a predefined default DSCP. In one embodiment, for example, the system 100 is configured to map all packets not of type IP, ARP, or UDAAN to the default DSCP. Moreover, while it is preferable that incoming packets 150 contain priority information, the system 100 may be configured to handle packets 150 not having priority labels by assigning such packets 150 a default DSCP.

The explicit congestion notification ("ECN") field may be used to vary the transmission of a packet flow based on the data contained in the ECN field, as known to those skilled in the art. For example, the transmission rate may be reduced when the ECN field indicates that the associated packet 150 has experienced congestion. The packet 150 may be marked as having experienced congestion under a wide variety of conditions, including when the system 100 has chosen the packet 150 to be dropped when a queue is not yet full.

The ECN field may be used to mark packets 150 of different protocols. For example, the ToS field of UDAAN packets 150 may be treated as an ECN field and used to mark the UDAAN packets 150 as having experienced congestion. Accordingly, the network 110 may support ECN tunneling, which is known in the art.

The packets 150 may include information or exhibit other characteristics that are observable by the system 100. The system 100 may be configured to use any such characteristics to classify packets 150 into distinct groups (i.e. classes). As mentioned above, the classes are useful for promoting flow fairness by allocating a portion of overall network resources to each class. For example, overall bandwidth may be shared among several different predefined classes.

In many embodiments, classes are defined according to packet protocols. For example, protocols generally known as having "elastic" behavior may comprise one class while protocols generally known as having "inelastic" behavior may be classified in another class. The term elastic refers to transmission protocols that adjust transmission rates based on network congestion. To illustrate, an elastic protocol will slow its transmission rate when signs of network congestion are observed (e.g., when one or packets 150 are dropped from a queue or marked in the ECN field as having experienced congestion). Conversely, the term inelastic refers to transmission protocols that do not vary their transmission speeds even when congestion is detected. As known to those skilled in the art, inelastic protocols may tend to choke out elastic protocols. Accordingly, the system 100 is capable of using classes to protect elastic protocol traffic from being overrun by inelastic protocol traffic.

D. Nodes

The nodes 130 may comprise any device or devices capable of routing the packets 150 over the links 140. For example, the nodes 130 may be in the form of routers, switches, gateways, and the like. Further, the nodes 130 may include any hardware, firmware, and/or software useful for implementing and operating the system 100. In many embodiments, the nodes 130 are capable of routing packets 150 at the network, sub-network, data link, and/or physical layers of the OSI model.

The nodes 130 may be configured to both encapsulate packets 150 into lower layers of the OSI model, as well as extract higher-layer packets 150 embedded in lower-layer packets 150, as known to those skilled in the art. Accordingly, the nodes 130 may receive packets 150 at the network or sub-network layers and encapsulate those packets 150 into link and/or physical layers for transmission over the links 140. The nodes 130 are configured to queue the packets 150 for submission to a hardware interface to the links 140. The hardware interface transmits the packets 150 over the links 140 to other nodes 140.

III. Exemplary Queue Management Systems

Figure 2:
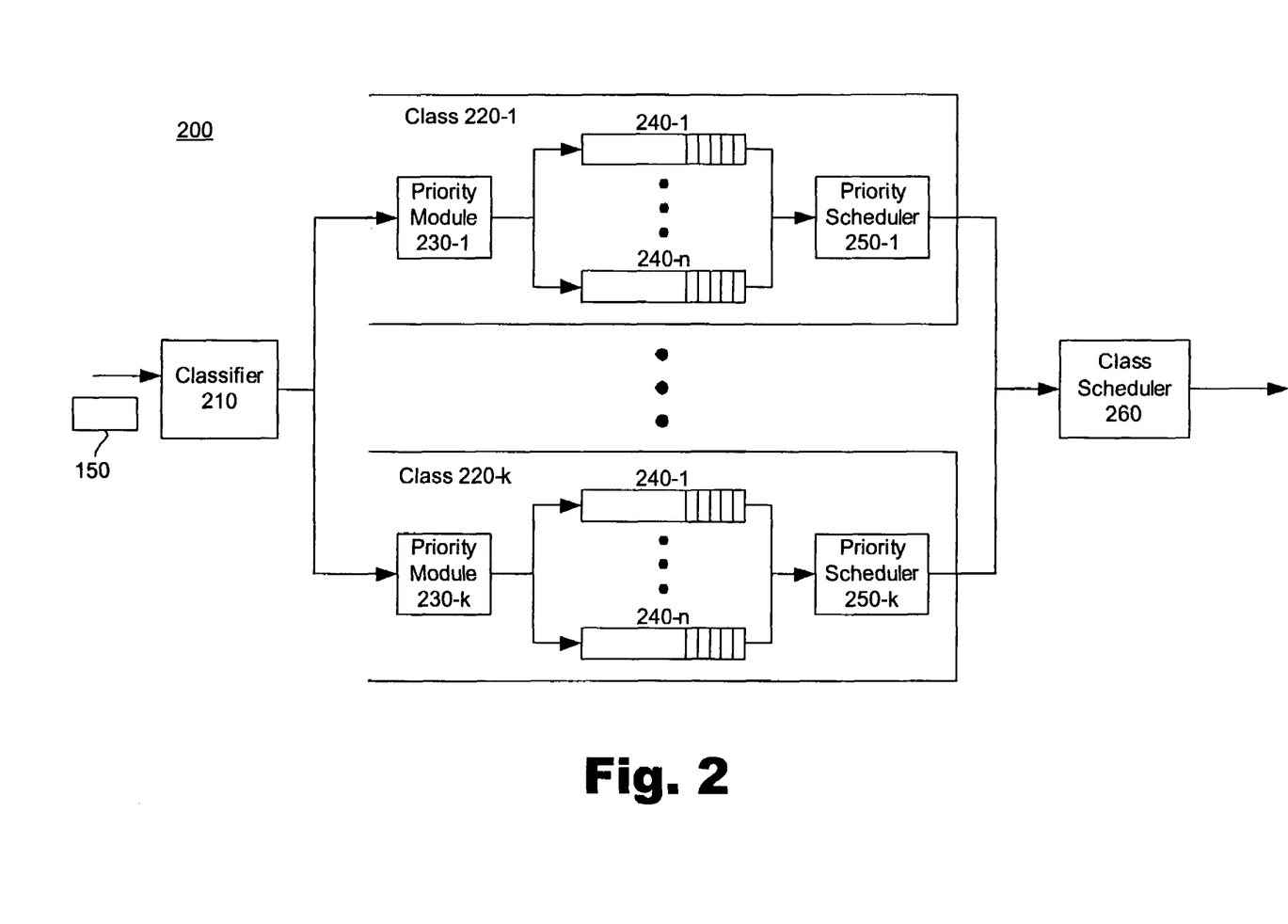
FIG. 2 is a block diagram illustrating one hybrid embodiment of the queue management system of FIG. 1.
Figure 3:
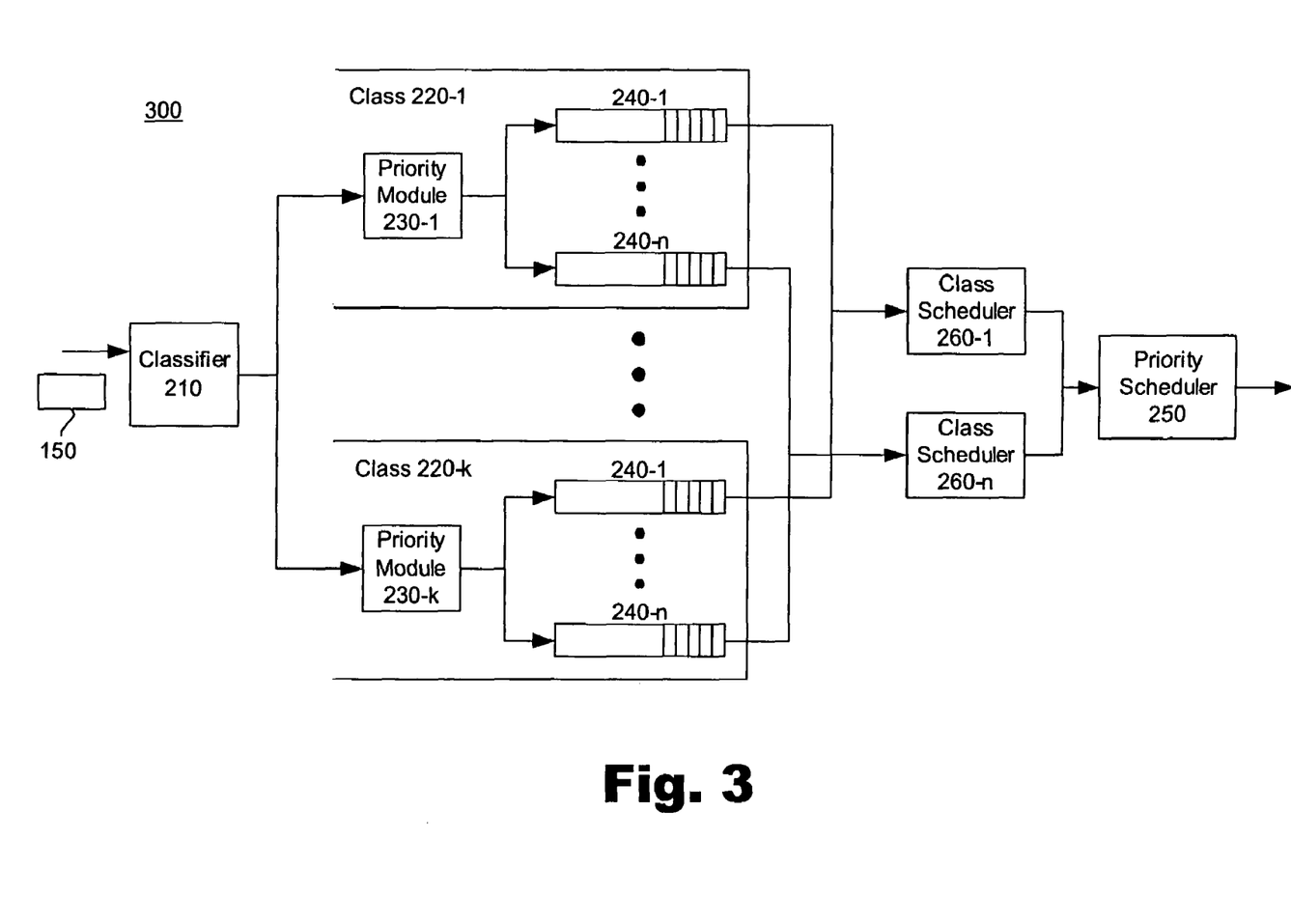
FIG. 3 is a block diagram illustrating another hybrid embodiment of the queue management system of FIG. 1.
Figure 4:
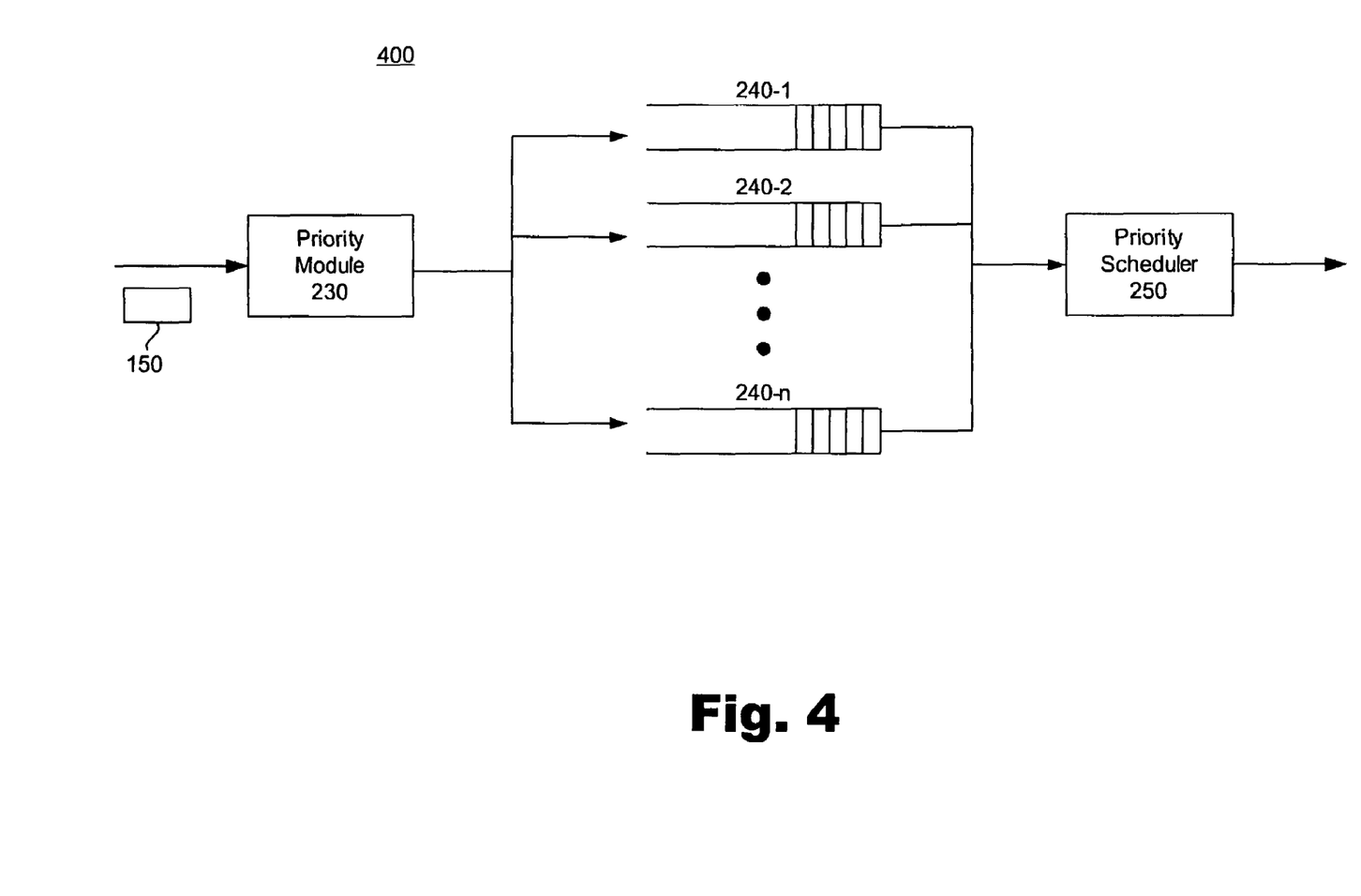
FIG. 4 is a block diagram illustrating yet another embodiment of the queue management system of FIG. 1.

As previously mentioned, one or more of the nodes 130 may have the queue management system 100 implemented therein. The queue management system 100 is configured to queue incoming packets 150 for transmission over the links 140. For example, node 130-1 may receive incoming packets 150 over one or more links 140 (e.g., link 140-1). The queue management system 100 queues the received packets 150 for transmission based on the priority levels associated with the packets 150. The system 100 may also queue the packets 150 based on both priority levels and classes associated with the packets 150. FIGS. 2, 3, and 4 each illustrate an exemplary embodiment of the system 100.

A. Exemplary Hybrid System (FIG. 2)

FIG. 2 is a block diagram of an exemplary queue management system 200 (also referred to as "the system 200"), according to one embodiment.

1. Classifier

As shown in FIG. 2, the system 200 includes a classifier 210, which is configured to assign incoming packets 150 to predetermined classes 220-1 through 220-k (collectively "the classes 220"). The packets 150 may be classified based on any observable packet or traffic flow characteristic(s). In some embodiments, for example, the classifier 210 is configured to classify the packets 150 based on the type of transmission protocol associated with the packets 150. For example, one class 220-1 may include any elastic transmission protocols (e.g., TCP), while another class 220-n may include packets conforming to any inelastic protocol (e.g., UDP).

2. Classes

The classes 220 may be predefined in any suitable manner. In one embodiment, for example, the classes 220 include a class for elastic packets, a class for inelastic packets, and a class for control packets.

Each of the classes 220 may be allocated a share of overall network resources, such as overall bandwidth of a particular link 140. In the embodiment described immediately above, for example, the control class may be allocated ten percent of available bandwidth, and each of the remaining classes may evenly divide the remaining bandwidth. By allocating bandwidth to the classes 220, the system 200 provides flow fairness between the classes 220. In particular, shares of bandwidth are reserved for low priority classes 220 so that prioritized traffic does not completely stop transmission of low priority traffic. Classes 220 may be used together with prioritization of packets 150 in order to strike a balance between priority transmissions and flow fairness.

The allocations of network resources may be flexible. In particular, temporary adjustments to the allocations may be made to handle temporary needs. For example, when the amount of elastic traffic exceeds the amount of bandwidth allocated for the elastic class, additional bandwidth may be temporarily borrowed, if available, from other classes (e.g., the inelastic class) to meet the need. This provides dynamic flexibility to meet the needs of changing distributions of traffic types.

3. Priority Module

Once the classifier 210 has assigned incoming packets 150 to classes 220, the system 200 may prioritize the packets 150 within each class 220, independently of packets 150 in other classes 220. As shown in FIG. 2, the system 200 includes priority module 230-1 through 230-k (collectively "the priority modules 230"), with one priority module 230-1 per class 220. The priority modules 230 are configured to assign packets 150 into one or more priority queues 240-1 through 240-n (collectively "the priority queues 240") within each class 220.

The priority module 230 may assign (e.g., add) the packets 150 to priority queues 240 using priority labels associated with the packets 150, including any form of priority labels described above. As previously described, the packets 150 may include a priority label in one or more fields. The priority module 230 is able to access the field(s) and use the priority label contained therein to determine the pre-assigned priority level of any particular packet 150. For packets 150 that do not have a pre-assigned priority level, the priority module 230 may assign such packets 150 to a predefined default priority queue 240. In this manner, the system 200 is able to handle both packets 150 having priority labels and packets 150 without any pre-assigned priority levels.

In many embodiments, the priority module 230 employs the functionalities of Random Early Detection ("RED") to add and drop packets to/from the priority queues 240. As known to those skilled in the art, RED is an implicit congestion avoidance mechanism that drops packets during periods of network overload in a fair manner, as opposed to standard tail-dropping of packets. RED drops packets stochastically according to the average queue length such that the probability of any particular packet flow having a packet dropped is proportional to the size of the flow. More specifically, RED operates by occasionally dropping packets entering a queue when the average queue size exceeds a minimum threshold (e.g., a predefined number of packets 150). The exact drop probability is a linear function of average queue size. As the number of packets over the minimum threshold increases, so does the drop probability. This has the effect of keeping the average queue size low while allowing occasional bursts of packets in the queue. When the maximum threshold is reached, space is made available in the queue for incoming packets by deleting random packets already established in the queue.

While RED tends to alleviate some negative effects of tail dropping by randomly spreading packet drops across the queue, RED has not in the past dropped packets 150 based on priority levels because RED has previously only been applied to priority queues 240 on an individual basis.

The priority module 230 extends the capabilities of RED by considering the priority levels of packets 150 during drop operations. The extended version of RED may be referred to as priority RED ("P-RED"). With P-RED, each of the priority modules 230 is able to consider which packets 150 to drop based on priority. In particular, the priority module 230 is configured to consider packet occupancy levels for groups of multiple priority queues 240 for purposes of drop operations. To illustrate, to determine whether to drop a packet 150 (or which packet 150 to drop), the priority module 230 is configured to consider the packets 150 in (i.e., the occupancy level of) a particular priority queue 240, as well as any packets 150 in (i.e., occupancy levels of) the priority queues 240 having a higher priority level than the particular priority queue 240. For example, a drop operation for the lowest priority queue 240 in a class 220 would consider the occupancy levels in every priority queue 240 in the class 220. At the other end of the spectrum, a drop operation for the highest priority queue 240 in the class 220 would consider only the occupancy level of the highest priority queues 240 and ignore the lower priority queues 240 in the class 220.

By considering in the occupancy levels of any particular priority queue 240 and all higher ranking priority queues 240 of the same class 220, the priority module 230 is able to drop packets 150 early, before they are forced to be subjected to lengthy queue delays due to prioritization of higher priority queues 240, or before tail dropping of packets begins due to a maximum aggregate occupancy threshold being reached. For example, when a low priority packet 150 is under consideration, the priority module 230 is not limited to determining only whether other packets 150 having the same level of priority are in the corresponding priority queue 240 of the class 220. Rather, the priority module 230 also checks for packets 150 of higher priority that are in the higher priority queues 240 of the class 220. Accordingly, the priority module 230 is able to recognize potential transmission delays for low priority packets 150 due to the presence of high priority packets 150 in the priority queues 240. Low priority packets 150 may then be dropped to reduce congestion in the low priority queues 240. In short, the priority modules 230 provide the benefits of RED extended to operate across groups of multiple priority queues 240 for purposes of packet drop functions. The groups are dynamic and may be determined based on the priorities of incoming packets 150. The groups may include one or more of the overall number of priority queues 240.

The priority drop functions of the priority module 230 allow low priority packets 150 to consider the higher priority packets 150 within the same class 220. Because low priority packets 150 are not blind to higher priority packets 150, the system 200 is able to aggressively drop packets 150 to reduce congestion in low priority queues 240 and beneficially enhance overall system performance based on the available bandwidth.

Once the priority module 230 has assigned packets 150 into the priority queues 240, the packets 150 not dropped from the priority queues 240 generally travel through the queues 240 in any manner known to those skilled in the art, including FIFO. Packets 150 in the packet queues 240 are also subject to being dropped by P-RED operations, as described above.

4. Priority Queues

The priority queues 240 may be in the form of any suitable data structure(s) (e.g., heaps) and may use any suitable form of memory allocation, including dynamic memory allocation. In some embodiments, one priority queue 240 is provided for each predetermined priority level. For example, in FIG. 2, priority queue 240-1 may be associated with the lowest priority level, and priority queue 240-$n$ may be associated with the highest priority level. In other embodiments, multiple priority levels may be grouped into one priority queue 240. The collection of priority queues 240 within a class 220 forms a P-RED group under control of the priority module 230.

5. Priority Scheduler

As shown in FIG. 2, each class 220 of the system 200 includes a priority scheduler 250-1 through 250-$k$ (collectively "the priority schedulers 250") configured to select the packets 150 in the queues 240 for transmission, based on priority. In particular, the priority scheduler 250 is configured to prioritize higher priority packets 150 over lower priority packets 150. For example, the priority scheduler 250 may be configured to give highest priority to any packets 150 existing in the priority queue 240 having the highest priority packets 150 (e.g., priority queues 240-$n$). In other words, if any packets 150 exist in the highest priority queue 240, those packets 150 will be scheduled next, even if packets 150 in lower priority queues 240 are forced to wait. The priority schedulers 250 may employ any known scheduling technologies capable of scheduling based on priority.

6. Class Scheduler

As shown in FIG. 2, each priority scheduler 250 can feed selected packets 150 to a class scheduler 260. The class scheduler 260 is configured to select packets 150 from the priority schedulers 250 and forward the selected packets 150 for transmission based on the class 220 of the packets 150. Accordingly, the class scheduler 260 is typically able to maintain class-of-service ("CoS") transmission rates by generally adhering to predetermined per-class allocation of network resources between classes 220. The class-based scheduler 260 may employ any known scheduling technologies capable of scheduling based on class.

The system 200 effectively provides a hybrid queue management tool that combines priority-based scheduling with class-based scheduling to balance delay priority and flow fairness. Transmission delays are chosen based on the priority levels of packets 150, yet flow fairness is maintained by the class scheduler 260. Packets 150 selected by the class scheduler 260 may be forwarded to a single queue (not shown) for a hardware interface (not shown) to a link 140 for transmission over the link 140.

The system 200 considers priority levels of packets 150 with respect to adding packets 150 to the queues 240, dropping packets 150 from the queues 240, and selecting the order by which packets 150 will be transmitted. In addition to using priority queuing to support QoS requirements, the system 200 keeps prioritization techniques from choking the transmission of low priority packets 150 by scheduling based on classes 220, as discussed above. Moreover, the system 200 is able to reduce variations in transmission delay for low priority packets 150 by guaranteeing low priority traffic access to a reserved share of overall bandwidth.

Although delay priority may be observed within each class 220, the class scheduler 260 does not observe packet delay priorities across the classes 220. Lower priority packets 150 from one class 220 may be transmitted before packets 150 of a higher priority from a different class 220. Thus, the system 200 is particularly well-suited for applications that benefit from balancing flow fairness and delay priority, with flow fairness being preferred over delay priority. The system 200 generally tends to favor flow fairness over delay priority because the class scheduler 260 is positioned downstream from the priority schedulers 250.

B. Another Exemplary Hybrid System (FIG. 3)

In other embodiments, class schedulers 260 may be positioned upstream from a priority scheduler 250 in order to balance flow fairness and delay priority in a manner that favors delay priority over flow fairness. FIG. 3 is a block diagram of another exemplary hybrid queue management system 300 (also referred to as "the system 300"), according to one embodiment. The system 300 is similar to the system 200, except that one or more class schedulers 260 may be configured to selectively pull packets 150 from the priority queues 240. As shown in FIG. 3, a class scheduler 260 may be provided for every set of priority queues 240 having a common priority level. More specifically, for example, class scheduler 260-1 may be arranged to pull packets 150 from each priority queue 240-1 of every class 220, and class scheduler 260-$n$ may be arranged to pull packets 150 from each priority queue 240-$n$ of every class 220. Accordingly, each class scheduler 260 is able to schedule packets 150 having a common priority level for transmission according to their classes 220. This keeps packets 150 of all priority levels flowing toward transmission based on predefined per-class bandwidth allocations.

As shown in FIG. 3, each of the class schedulers 260 is arranged to feed packets 150 to a priority scheduler 250, which selects packets 150 for transmission based on priority levels. Thus, packets 150 selected by the particular class scheduler 260-$n$ associated with the particular priority queues 240-$n$ containing the highest priority packets 150 will be prioritized over other packets 150 selected by other class schedulers 260 (e.g., class scheduler 260-1). In other words, if the highest priority class scheduler 260-$n$ contains any packets 150, those packets 150 will be selected first by the priority scheduler 250 for transmission over a particular link 140, even if such action will cause packets 150 selected by other class schedulers 260 to experience additional transmission delays as a result.

As with the system 200 in FIG. 2, the system 300 is able to balance flow fairness and delay priority. By positioning the priority scheduler 250 downstream from the class schedulers 260, the system 300 provides a balance that tends to favor delay priority over flow fairness. Accordingly, the system 300 is well-suited for applications the may benefit from a balance and that also prefer to favor delay priority over flow fairness. Examples of such applications include any network that supports guaranteed QoS levels for transmissions of critical and/or time-sensitive data types (e.g., military radio and VoIP).

C. Exemplary System of FIG. 4

FIG. 4 is a block diagram illustrating yet another embodiment of the queue management system of FIG. 1. The system 400 of FIG. 4 includes the priority module 230, the priority queues 240, and the priority scheduler 250 described above in relation to FIG. 2. As shown in FIG. 4, however, the system 400 may be implemented in a node 130 without being combined with a class-based component. This may be preferable in networks 110 supporting applications that require strict observance of delay priority at the expense of flow fairness. Even without class-based scheduling, the system 400 is able to reduce the extent to which low priority traffic may experience congestion and variable latencies. This benefit is provided at least in part by the priority module 230, which is configured to consider priority of packets 150 for drop operations by operating across dynamic groups of priority queues 240, as discussed above.

IV. Process Flow View

Figure 5:
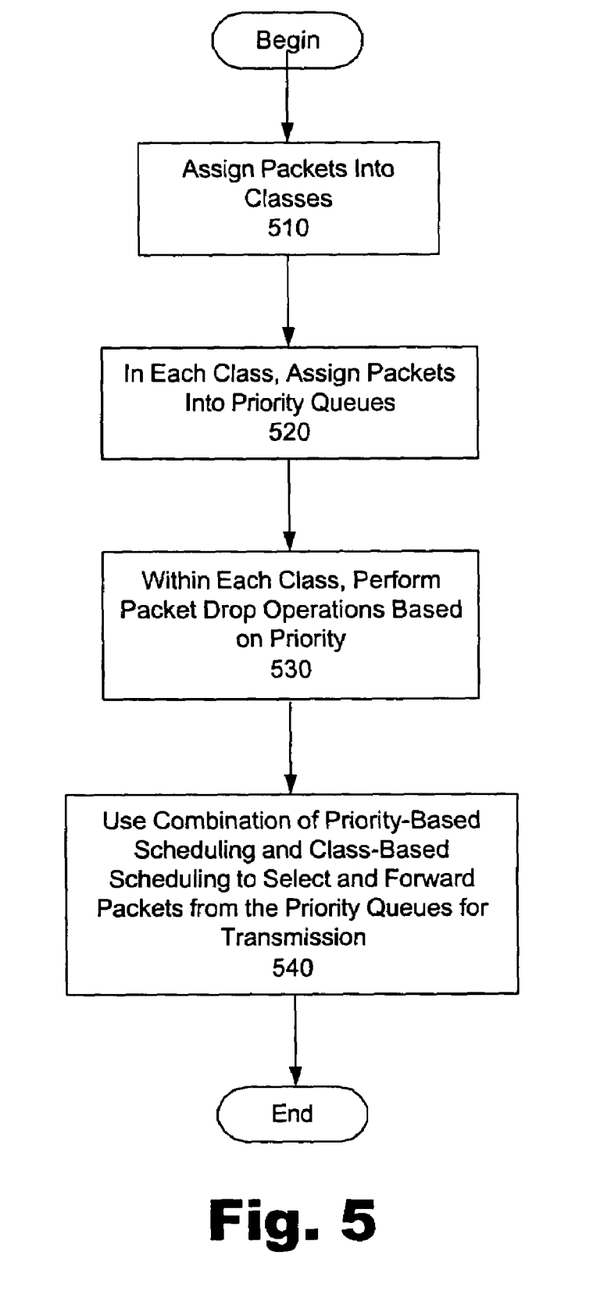
FIG. 5 is a flowchart illustrating an example of a method for queuing traffic using the exemplary queue management systems of FIGS. 2 and 3.

FIG. 5 is a flowchart illustrating an example of a method for queuing traffic using the exemplary queue management systems 200 and 300. While FIG. 5 illustrates exemplary steps according to one embodiment, other embodiments may omit, add to, and/or modify any of the steps shown in FIG. 5.

The process of FIG. 5 begins by assigning incoming packets 150 into classes 220 at step 510. Step 510 may be performed by the classifier 210 in any of the ways described above.

At step 520, the packets 150 are assigned to priority queues 240 within each class 220, based on priority levels associated with the packets 150. Step 520 includes adding packets to the priority queues 240 in any of the ways described above.

At step 530, packet drop operations are performed within each class 220, based on priority. Step 530 may be performed in any of the ways described above, including treating the priority queues 240 in each class 220 as a single P-RED group.

At step 540, a combination of priority-based scheduling and class-based scheduling is used to select and forward packets 150 from the priority queues 240 for transmission. Step 540 may be performed in any of the ways described above.

In conclusion, the systems and methods disclosed herein provide queue management that supports packet drops based on priority levels of the packets 150. Further, the systems and methods provide balances between transmission delay priority and traffic flow fairness. The systems and methods may combine class-based and priority-based queuing processes to provide unique balances between transmission delay priorities and flow fairness so that higher-priority traffic is prioritized for transmission while the flow of lower priority traffic is considered. In addition, the flow of lower priority traffic can be guaranteed without overly limiting prioritization of higher priority traffic.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system, comprising:
   a plurality of queues;
   a plurality of priority levels associated with said queues; and
   a priority module configured to
      dynamically determine a group of said queues based on said priority levels,
      assign incoming packets to said queues based on priorities associated with the incoming packets,
      drop at least one of a plurality of packets already contained in said group of said queues, operate across multiple said queues when determining which of said plurality of packets contained in said queues to drop, and
      drop at least one of said plurality of packets from a first of said queues to make room for assigning at least one of the incoming packets to a second of said queues, wherein said group of said queues comprises a first of said queues having a first priority level, and each of said queues having higher priority levels than said first priority level.

2. The system of claim 1, wherein said priority module is configured to operate on said group of said queues when determining which of said plurality of packets contained in said queues to drop.

3. The system of claim 1, wherein said priority module is configured to consider occupancy levels of said multiple queues when determining which of said plurality of packets contained in said queues to drop.

4. The system claim 1, further comprising a plurality of priority levels associated with said queues, and wherein said first of said queues is associated with a first of said priority levels, and said second of said queues is associated with a second of said priority levels, said second priority level having a higher priority than said first priority level.

5. The system of claim 1, wherein said priority module is configured to provide Random Early Detection ("RED") functionality and to extend said RED functionality across said multiple queues by considering occupancy levels of said multiple queues as a group during packet drop operations.

6. The system of claim 1, further comprising:
a second plurality of queues;
a second priority module;
a plurality of priority levels associated with said plurality of queues and said second plurality of queues;
a plurality of classes including at least a first class and a second class, said first class including said plurality of queues and said priority module, and said second class including said second plurality of queues and second priority module;
a classifier configured to selectively assign received packets between said plurality of classes; and
a combination of at least one priority scheduler and at least one class scheduler, said combination being configured to selectively schedule packets contained in said plurality of queues and said second plurality of queues for transmission based on said classes and said priority levels.

7. The system of claim 6, wherein said at least one class scheduler is configured to select said packets contained in said plurality and queues and said second plurality of queues based on said classes, and wherein said at least one priority scheduler is configured to selectively schedule said selected packets for transmission based on said priority levels.

8. The system of claim 6, wherein said combination includes one of said at least one priority scheduler for each of said plurality of classes, including a first priority scheduler for said first class and a second priority scheduler for said second class, said first priority scheduler being configured to select packets contained in said plurality of queues based on said priority levels, and said second priority scheduler being configured to select packets contained in said second plurality of queues based on said priority levels, and wherein said at least one class scheduler is configured to selectively schedule the packets selected by said first priority scheduler and said second priority scheduler for transmission based on said classes.

9. The system of claim 1, wherein said priority module is configured to drop one or more of the incoming packets before the number of said packets contained in said queues has reached a maximum occupancy, said priority module being configured to operate across said multiple queues when determining which of the incoming packets to drop.

10. A system, comprising:
a plurality of queues;
a plurality of priority levels associated with said queues; and
a priority module configured to
dynamically determine a group of said queues based on said priority levels,
assign incoming packets to said queues based on priorities associated with the incoming packets,
drop one or more of the incoming packets before the number of packets already contained in said queues has reached a maximum occupancy,
operate on said group of said queues when determining which of the incoming packets to drop, and
drop at least one of said plurality of packets from a first of said queues to make room for assigning at least one of the incoming packets to a second of said queues, wherein said group comprises a first of said queues having a first priority level, and each of said queues having higher priority levels than said first priority level.

11. The system of claim 10, wherein said priority module is configured to consider occupancy levels of said multiple queues when determining which of the incoming packets to drop.

12. The system of claim 10, wherein said priority module is configured to provide Random Early Detection ("RED") functionality and to extend said RED functionality across said multiple queues by considering occupancy levels of said multiple queues as a group during packet drop operations.

13. The system of claim 10, further comprising:
a second plurality of queues;
a second priority module;
a plurality of priority levels associated with said plurality of queues and said second plurality of queues;
a plurality of classes including at least a first class and a second class, said first class including said plurality of queues and said priority module, and said second class including said second plurality of queues and second priority module;
a classifier configured to selectively assign received packets between said plurality of classes; and
a combination of at least one priority scheduler and at least one class scheduler, said combination being configured to selectively schedule packets contained in said plurality of queues and said second plurality of queues for transmission based on said classes and said priority levels.

14. The system of claim 13, wherein said at least one class scheduler is configured to select said packets contained in said plurality of queues and said second plurality of queues based on said classes, and wherein said at least one priority scheduler is configured to selectively schedule said selected packets for transmission based on said priority levels.

15. The system of claim 13, wherein said combination includes one of said at least one priority scheduler for each of said plurality of classes, including a first priority scheduler for said first class and a second priority scheduler for said second class, said first priority scheduler being configured to select packets contained in said plurality of queues based on said priority levels, and said second priority scheduler being configured to select packets contained in said second plurality of queues based on said priority levels, and wherein said at least one class scheduler is configured to selectively schedule the packets selected by said first priority scheduler and said second priority scheduler for transmission based on said classes.

16. The system of claim 10, wherein said priority module is configured to drop at least one of said packets already contained in said queues, said priority module being configured to operate across said multiple queues when determining which of said packets contained in said queues to drop.

17. A system, comprising:
a plurality of classes;
a plurality of queues within each of said classes;
a plurality of priority levels associated with said queues;
a classifier configured to selectively assign incoming packets to said classes;
a priority module for each of said classes, said priority module being configured to
dynamically determine a group of said queues based on said priority levels,
assign the incoming packets within each of said classes to said queues based on priorities associated with the incoming packets, drop one or more of the incoming packets before the number of packets already contained in said queues has reached a maximum occupancy, operate across multiple said queues when determining which of the incoming packets to drop, and drop at least one of said plurality of packets from a first of said queues of said group of queues to make room for assigning at least one of the incoming packets to a second of said queues: and a combination of at least one priority scheduler and at least one class scheduler, said combination being configured to selectively schedule said packets contained in said queues for transmission based on said classes and said priority levels.

18. The system of claim 17, wherein said at least one class scheduler is configured to select said packets contained in said plurality queues based on said classes, and wherein said at least one priority scheduler is configured to selectively schedule said selected packets for transmission based on said priority levels.

19. The system of claim 17, wherein said combination includes one of said at least one priority scheduler for each of said plurality of classes, said priority scheduler being configured to select said packets contained in said queues based on said priority levels, and wherein said at least one class scheduler is configured to selectively schedule said selected packets for transmission based on said classes.

20. A system, comprising:
a plurality of classes;
a plurality of queues within each of said classes;
priority levels associated with said queues;
a classifier configured to selectively assign incoming packets to said classes;
a priority module for each of said classes, said priority module being configured to
assign incoming packets to said queues based on priorities associated with the incoming packets,
dynamically determine a group of said queues based on said priority levels,
drop at least one of a plurality of packets already contained in said group of said queues,
operate across multiple said queues when determining which of said plurality of packets contained in said queues to drop, and
drop at least one of said plurality of packets from a first of said queues to make room for assigning at least one of the incoming packets to a second of said queues; and
a combination of at least one priority scheduler and at least one class scheduler, said combination being configured to selectively schedule said packets contained in said queues for transmission based on said classes and said priority levels.

21. The system of claim 20, wherein said at least one class scheduler is configured to select said packets contained in said plurality queues based on said classes, and wherein said at least one priority scheduler is configured to selectively schedule said selected packets for transmission based on said priority levels.

22. The system of claim 20, wherein said combination includes one of said at least one priority scheduler for each of said plurality of classes, said priority scheduler being configured to select said packets contained in said queues based on said priority levels, and wherein said at least one class scheduler is configured to selectively schedule said selected packets for transmission based on said classes.

23. A method comprising:
selectively assigning incoming packets to one of a plurality of classes;
selectively assigning each of the packets to one of a plurality of queues within each class based on priorities associated with the packets;
dynamically determining a group of said queues based on priority levels associated with said queues;
determining whether to drop at least one of a plurality of packets already contained in said queues, said determining step including operating across multiple said queues to make said determination;
operating on said group of said queues to determine which of said plurality of packets contained in said queues to drop; and
dropping at least one of said plurality of packets from a first of said queues to make room for assigning at least one of the incoming packets to a second of said queues.

24. The method of claim 23, wherein said determining step includes considering occupancy levels of said multiple queues as a group.

25. The method of claim 23, further comprising:
providing Random Early Detection ("RED") functionality; and
extending said RED functionality across said multiple queues by considering occupancy levels of said multiple queues during packet drop operations.

26. The method of claim 23, further comprising determining whether to drop one or more of the incoming packets before the number of said plurality of packets contained in said queues has reached a maximum occupancy, said step of determining whether to drop one or more of the incoming packets including operating across said multiple queues when determining whether to drop one or more of the incoming packets.

27. A method comprising:
selectively assigning incoming packets to one of a plurality of classes;
selectively assigning each of the packets to one of a plurality of queues within each class based on priorities associated with the packets;
dynamically determining a group of said queues based on priority levels associated with said queues;
determining whether to drop one or more of the incoming packets before the number of packets already contained in said queues has reached a maximum occupancy, said determining step including operating across multiple said queues to make said determination; and
operating on said group of said queues to determine which of the incoming packets to drop;
dropping at least one of said plurality of packets from a first of said queues to make room for assigning at least one of the incoming packets to a second of said queues.

28. The method of claim 27, wherein said determining step includes considering occupancy levels of said multiple queues as a group.

29. The method of claim 27, further comprising:
providing Random Early Detection ("RED") functionality; and
extending said RED functionality across said multiple queues by considering occupancy levels of said multiple queues during packet drop operations.

30. The method of claim 27, further comprising determining whether to drop at least one of said packets contained in said queues, said step of determining whether to drop at least one of said packets contained in said queues including operating across said multiple queues when determining whether to drop at least one of said packets contained in said queues.

31. A method comprising:
selectively classifying incoming packets to a plurality of classes; and
within each of said classes:
selectively assigning the classified incoming packets to a plurality of queues based on priorities associated with the packets;
dynamically determining a group of said queues based on priority levels associated with said queues;
determining whether to drop at least one of a plurality of packets already contained in said queues, said determining step including operating across multiple said queues to make said determination;
operating on said group of said queues to determine which of said plurality of packets contained in said queues to drop; and
dropping at least one of said plurality of packets from a first of said queues to make room for assigning at least one of the incoming packets to a second of said queues.

32. The method of claim 31, wherein said determining step includes considering occupancy levels of said multiple queues as a group.

33. The method of claim 31, further comprising, within each of said classes:
providing Random Early Detection ("RED") functionality; and
extending said RED functionality across said multiple queues by considering occupancy levels of said multiple queues during packet drop operations.

34. The method of claim 31, further comprising scheduling said plurality of packets contained in said queues for transmission based on both priority levels associated with said queues and said plurality of classes.

35. The method of claim 31, further comprising:
within each class, selecting packets from said plurality of packets within said queues for transmission based on priority levels associated with said queues; and
across said plurality of classes, scheduling said selected packets for transmission based on said plurality of classes.

36. The method of claim 31, further comprising:
across said plurality of classes, selecting packets from said plurality of packets for transmission based on said plurality of classes and priority levels associated with said queues; and
scheduling said selected packets for transmission based said priority levels of said queues.

37. A method comprising:
selectively classifying incoming packets to a plurality of classes; and
within each of said classes:
selectively assigning the classified incoming packets to a plurality of queues based on priorities associated with the packets;
dynamically determining a group of said queues based on priority leveles associated with said queues;
determining whether to drop one or more of the classified incoming packets before the number of packets already contained in said queues has reached a maximum occupancy, said determining step including operating across multiple said queues to make said determination;
operating on said group of said queues to determine which of the classified incoming packets to drop; and
dropping at least one of said plurality of packets from a first of said queues to make room for assigning at least one of the incoming packets to a second of said queues.

38. The method of claim 37, wherein said determining step includes considering occupancy levels of said multiple queues as a group.

39. The method of claim 37, further comprising, within each of said classes:
providing Random Early Detection ("RED") functionality; and
extending said RED functionality across said multiple queues by considering occupancy levels of said multiple queues during packet drop operations.

40. The method of claim 37, further comprising scheduling said plurality of packets contained in said queues for transmission based on both priority levels associated with said queues and said plurality of classes.

41. The method of claim 37, further comprising:
within each class, selecting packets from said plurality of packets within said queues for transmission based on priority levels associated with said queues; and
across said plurality of classes, scheduling said selected packets for transmission based on said plurality of classes.

42. The method of claim 37, further comprising:
across said plurality of classes, selecting packets from said plurality of packets for transmission based on said plurality of classes and priority levels associated with said queues; and
scheduling said selected packets for transmission based said priority levels of said queues.

43. A computer-readable medium having instructions thereon, said instructions being configured to instruct a computer to perform the steps of:
selectively classifying incoming packets to a plurality of classes; and
within each of said classes:
selectively assigning the classified incoming packets to a plurality of queues based on priorities associated with the packets;
determining whether to drop one or more of the classified incoming packets before the number of packets already contained in said queues has reached a maximum occupancy, said step of determining whether to drop one or more of the classified incoming packets including
dynamically selecting a group of said queues based on the priority associated with at least one the incoming packets, said group including multiple said queues, and
operating across said group of said queues to make said determination;
determining whether to drop at least one of said packets already contained in said queues, said step of determining whether to drop at least one of said packets already contained in said queues including operating across said group of said queues to make said determination; and
dropping at least one of said plurality of packets from a first of said queues to make room for assigning at least one of the incoming packets to a second of said queues.

* * * * *